Patented Apr. 9, 1940

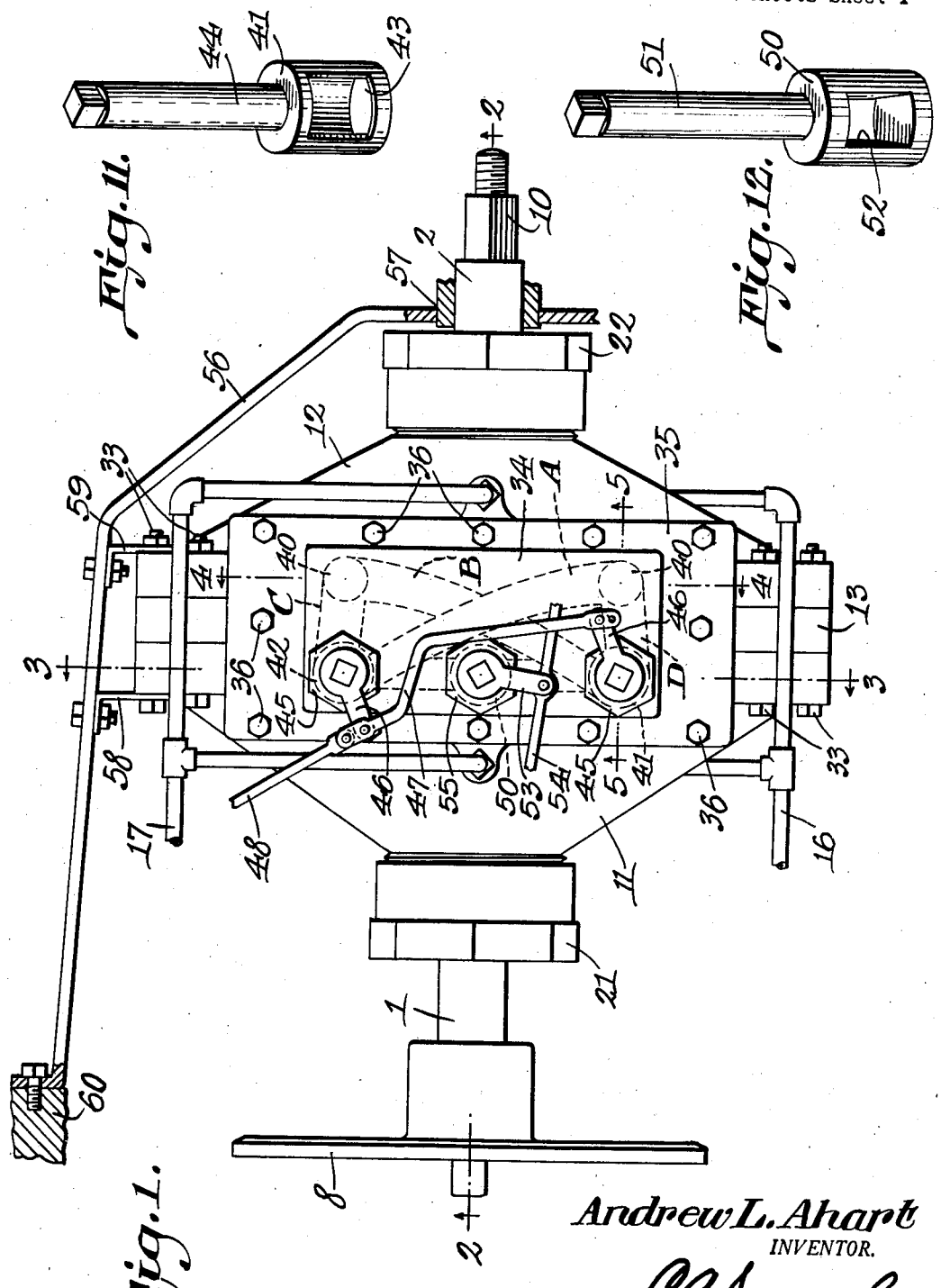

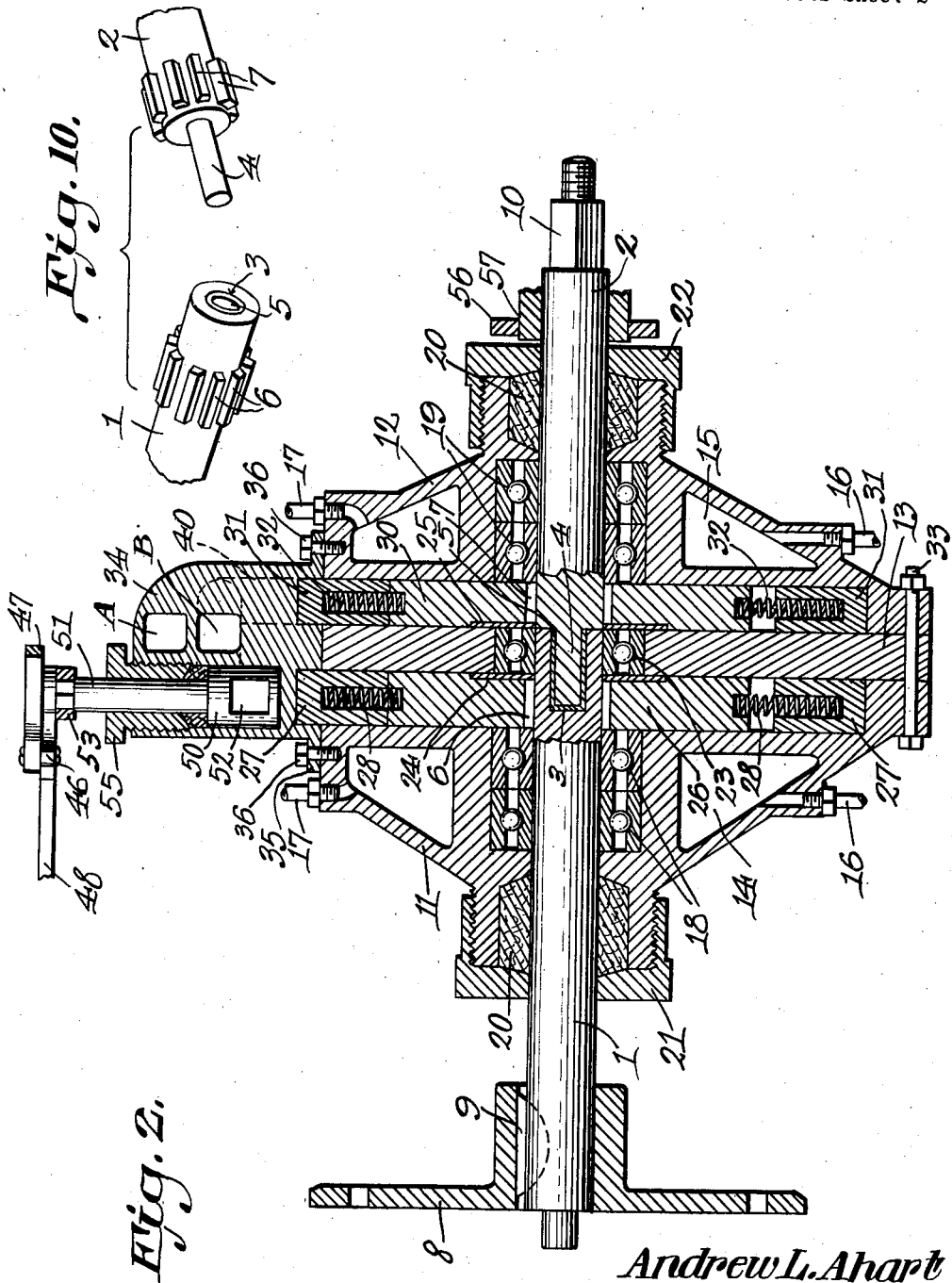

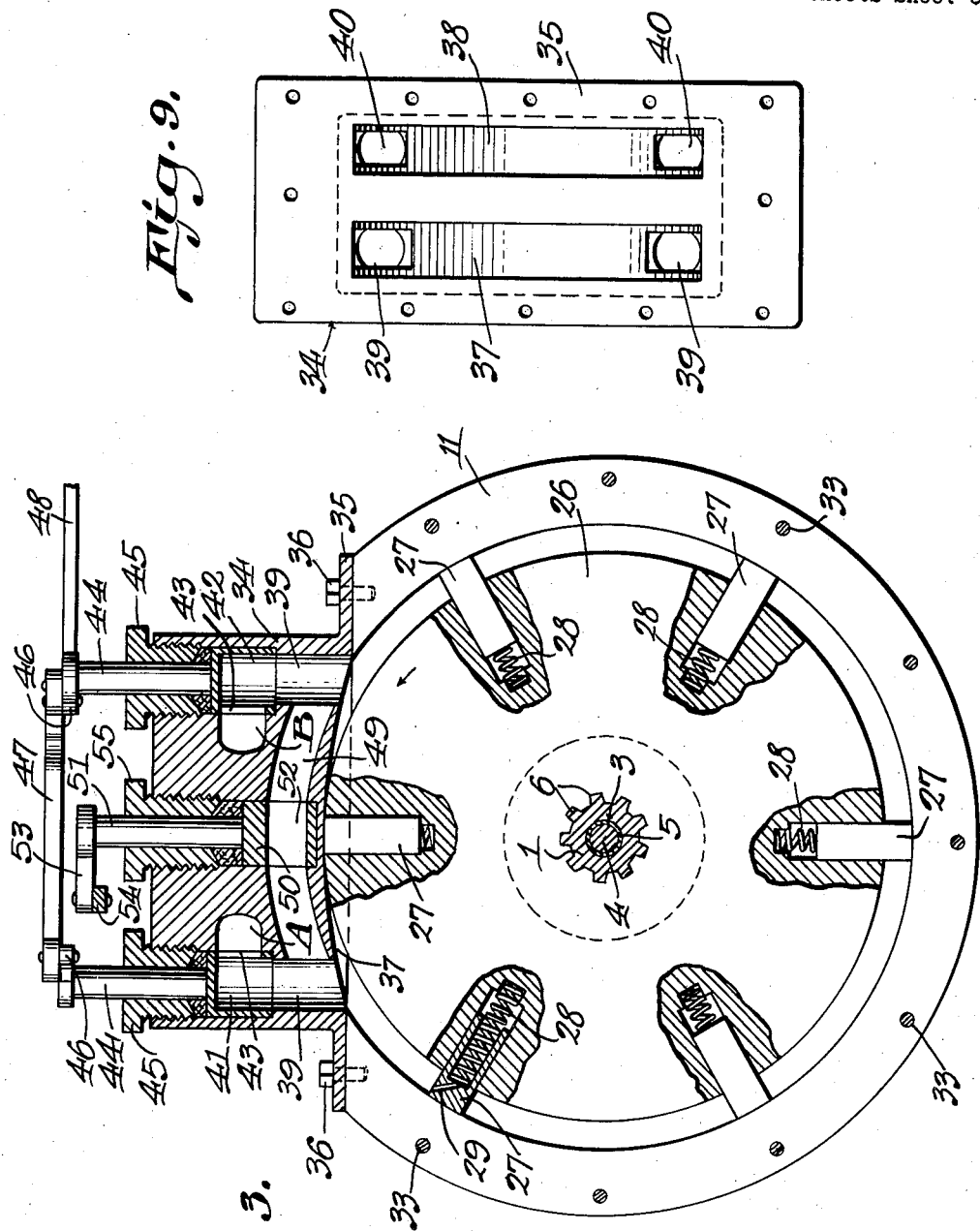

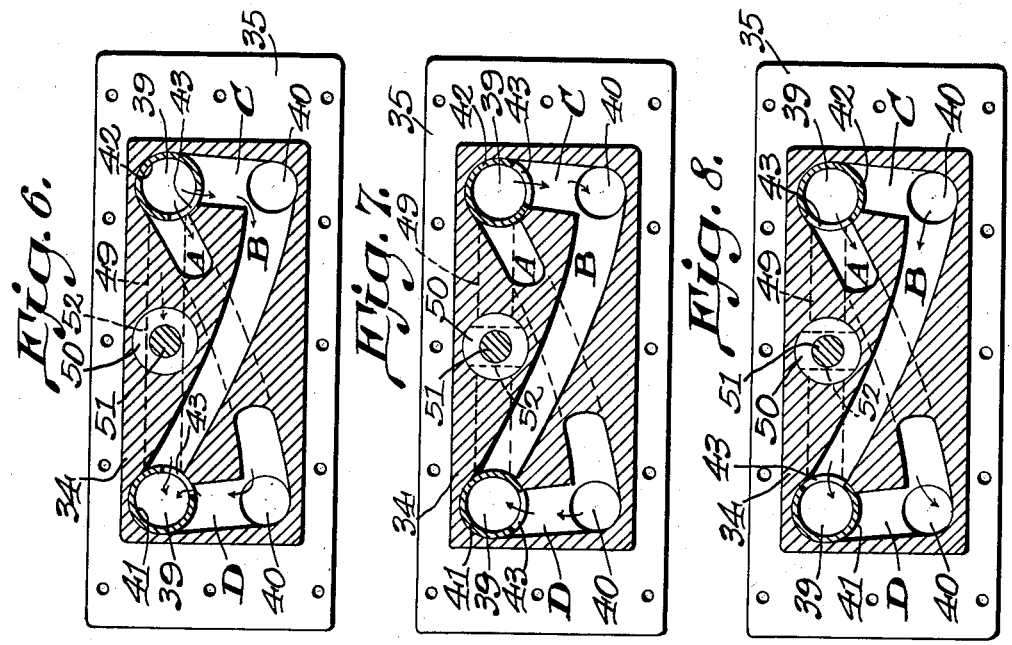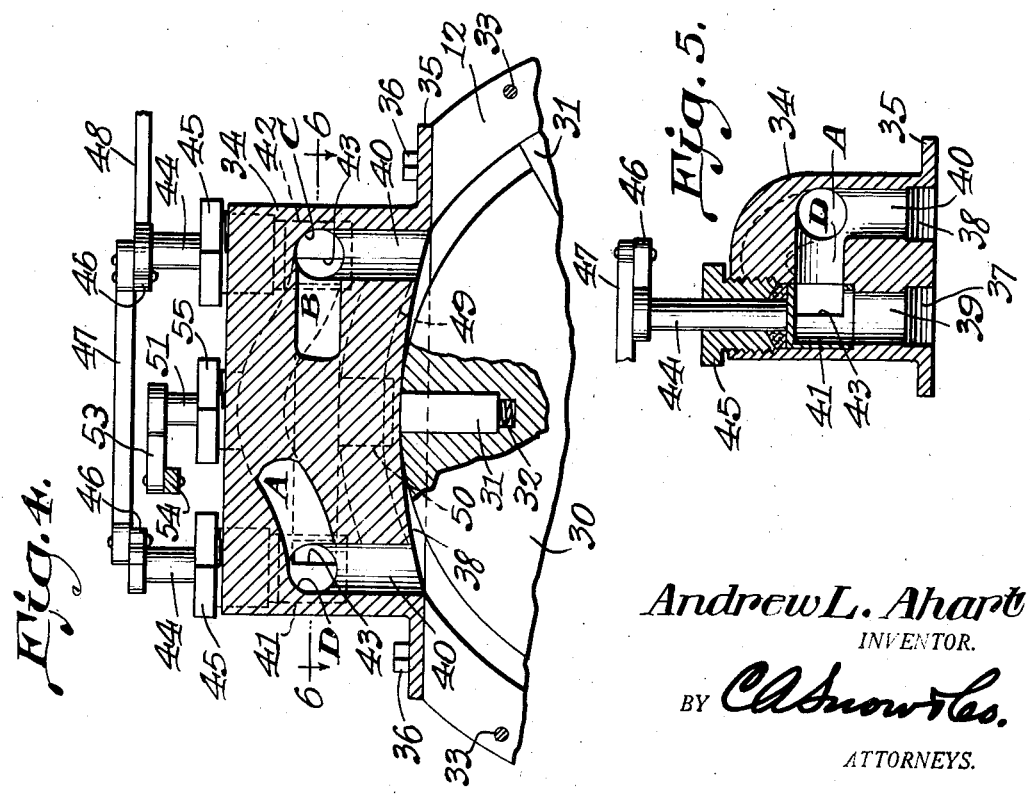

2,196,350

UNITED STATES PATENT OFFICE 2,196,350

HYDRAULIC TRANSMISSION

Andrew Leroy Ahart, Orlando, Fla.

Application March 17, 1938, Serial No. 196,528

3 Claims. (Cl. 60—53)

This invention aims to provide, in a hydraulic transmission, embodying a pair of spaced cooperating driving and driven disks, a novel valve mechanism comprising a pair of inter-connected control valves, and a by-pass valve interposed between said control valves, whereby, through the instrumentality of the disks, the transmission mechanism may be operated to obtain a forward drive, a reverse drive, or a neutral no-drive condition.

In the accompanying drawings which form a part of this application:

Figure 1 is a plan view of the improved hydraulic clutch or transmission mechanism;

Figure 2 is a vertical longitudinal sectional view taken on the line 2—2 of Figure 1;

Figure 3 is a sectional view taken on the line 3—3 of Figure 1 with parts shown in elevation, and broken away;

Figure 4 is a partial sectional view taken on the line 4—4 of Figure 1;

Figure 5 is a detail sectional view taken on the line 5—5 of Figure 1;

Figure 6 is a sectional view taken on the line 6—6 of Figure 4;

Figure 7 is a sectional view taken on the line 6—6 of Figure 4, but with the valve arranged to provide for a reverse drive;

Figure 8 is a sectional view taken on the line 6—6 of Figure 4, but with the control valve arranged to provide for a forward drive;

Figure 9 is a bottom plan view of the valve casing in which the control valves are located;

Figure 10 is a dissembled view of the cooperating drive and driven shafts, showing the splines formed thereon;

Figure 11 is a perspective view of one of the improved control valves, showing the same open at the bottom and provided with a lateral port through the side thereof, and Figure 12 is a perspective view of the by-pass valve showing the same provided with a transverse passageway or port formed through its body portion.

The drawings show a pair of cooperating alined shafts, comprising a driving shaft 1 and a driven shaft 2. The driving shaft 1 has a socket 3 in its end, adapted to receive a reduced extension 4 on the driven shaft, and a packing gasket 5 receives the reduced extension 4. A hub 8 is keyed at 9 to the driving shaft 1 and connects the shaft with a source of power (not shown). The outer end of the driven shaft 2 is provided with a squared shank 19 which is connected with mechanism to be driven.

The machine comprises a pair of cooperating annular casings 11 and 12, between which is interposed a spacing partition disk 13. Annular passages 14 and 15 are formed in the casings 11 and 12 respectively, and receive a cooling fluid through an inlet pipe 16, the fluid being discharged through an outlet pipe 17.

Ball bearings 18 and 19 are disposed within the casings 11 and 12 and receive the inner ends of the driving shaft 1 and the driven shaft 2, respectively. The outer ends of the casings 11 and 12 are reduced, and carry glands 20—21—22 wherein the driving and driven shafts 1—2 are journaled.

A ball bearing 23 is disposed within the spacing disk 13, and receives the inner end of the shaft 1. Packing rings 24 and 25 are positioned on opposite sides of the partition 13 and the ball bearing 23, to prevent the oil in the transmission or clutch from passing from one casing 11—12 to the other.

Disposed between the casing 11 and the adjacent side of the spacing disk or partition 13 is a driving disk 26, most clearly illustrated in Figure 3. This disk 26 is fixed to the driving shaft 1 by a spline 6, and is provided with a plurality of radially extending vanes 27, behind which springs 28 are positioned, to force them outwardly.

A bleeder passage 29 is formed in the outer end of each of the vanes 27, and permits oil which may work into the vane to drain therefrom and back into the oil which is pumped through the transmission mechanism.

A driven disk 30 is secured to the driven shaft 2 by a spline 7, and is provided with a plurality of radially extending vanes 31, behind which coiled springs 32 are disposed, to force the vanes outwardly. The driven disk 30 is positioned between the casing 12 and the adjacent side of the spacing disk or partition 13. The casing elements 11 and 12, and the intermediate spacing disk or partition 13 are held assembled by transverse bolts 33, and the machine can be taken down when necessary.

A valve casing or housing 34 is shown, and has an elongated base plate 35, held on top of the casings 11 and 12, by screws 36. The lower end of the valve casing 34 (Fig. 9) has a pair of longitudinally extending bowed passageways 37 and 38, which terminate at their opposite ends in vertical passageways 39 and 40, which cooperate with the driving and driven disks 26—30, respectively.

Control valves 41 and 42 are positioned within the vertical passages 39 and 40 in the valve casing 34, and are illustrated in Figure 11 of the drawings. The valves 41 and 42 have open lower ends and side ports 43, and are provided with shanks 44 which extend upwardly through threaded bushings 45 in the valve casing 34. Laterally extending arms 46 are secured to the outer ends of the valve stems 44, and are inter-connected by a bar 47, and a lever 48 under the control of an operator. A passageway 49 in the casing 34 (Fig. 3) connects the two valves 41 and 42, and is controlled by a by-pass valve 50, which is illustrated in Figure 12 of the drawings and is mounted to turn in the casing 34. The valve 50 is provided with a shank 51, and the valve proper is supplied with a transverse opening 52, which is adapted to register with the passageway 49, to control the flow of fluid therethrough. From Figures 6, 7 and 8 of the drawings it will be apparent that passageways D and C in the casing 34 connect the adjacent vertical passages 39 and 40 respectively. Passageways A and B extend diagonally across the valve casing and connect opposed vertical passageways 39 and 40. Passageway A is shown as being looped over passageway B within the valve casing 34. A control arm 53 and an operating handle 54 are mounted on the stem 51 of the by-pass valve 50. A threaded bushing 55 in the casing 34 receives the stem 51 of the bypass valve 50.

When it is desired to retain the clutch in its neutral or inoperative position, the by-pass valve 50 is opened to permit communication of the fluid between the valves 39, as illustrated in Figure 6 of the drawings, and the valves 39 will be so positioned that they will be partially opened to the passageways A and C, and B and D. Under such circumstances, the fluid contained within the casing 11—12 and the valve housing 34 will merely churn, the travel of the oil or fluid being up the right hand vertical passageway, through the adjacent passages A and C and from the passageways B and D to the left hand vertical passageway 39; thence down therethrough to the driving disk 26, where it will be forced in a counterclockwise direction again up to the right hand passageway 39.

When it is desired to operate the transmission mechanism in a reverse direction, the by-pass valve 50 is turned at right angles across the passageway 49 and the valves 39 are turned to permit the fluid to come up the right hand vertical passageway and through the passage C, down through the right hand passageway 40, to the driven disk 30, and the fluid will come up the left hand passageway from the driven disk, through the passageway D, through the left hand valve 39 and down that passageway to and through the driving disk 26. In this manner the driving and driven disks will rotate counterclockwise and clockwise, respectively.

When it is desired to drive forwardly, the by-pass valve 50 is closed to prevent fluid passing through the passageway 49, and the valves 39 are turned so that the fluid will pass up through the vertical passageway to the right hand valve 39 and through passageway A, down through the left hand passageway 40, around the driven disk 30 and up through the right hand passageway 40; thence through passageway B, through the left hand control valve 39 and down through it to and around the driving disk 26, and again up through the right hand passageway 39, to and through the right hand valve.

A brace 56 is connected at 57—58—59 to the transmission and to a fixed support 60, whereby casing parts will be kept from rotation, thereby permitting operation as a transmission.

Having thus described the invention, what is claimed is:

1. A hydraulic transmission mechanism including a fluid-holding casing, alined driving and driven shafts mounted axially in the casing, a drive disk mounted on the driving shaft, a driven disk mounted on the driven shaft, a valve housing disposed upon the casing and provided with a pair of upwardly extending passages communicating with the driving disk, the housing being provided with a pair of upwardly extending passages communicating with the driven disk, control valves in the passages communicating with the driving disk, the valves being open at their lower ends and being provided with laterally opening ports, the valve housing being provided with passages connecting the adjacent upwardly extending passages communicating with the driving and driven disks, the valve housing being provided with transversely disposed passages extending from an upwardly extending passage communicating with the driving disk, to an upwardly extending passage communicating with the driven disk, and means for operating the control valves simultaneously, to effect the placing of the transmission mechanism in neutral position, in reverse position, or in forward position.

2. A hydraulic transmission mechanism including a fluid-holding casing, alined driving and driven shafts mounted axially in the casing, a drive disk mounted on the driving shaft, a driven disk mounted on the driven shaft, a valve housing disposed upon the casing and provided with a pair of upwardly extending passages communicating with the driving disk, the housing being provided with a pair of upwardly extending passages communicating with the driven disk, control valves in the passages communicating with the driving disk, the valves being open at their lower ends and being provided with laterally-opening ports, the valve housing being provided with passages connecting the adjacent upwardly extending passages communicating with the driving and driven disks, the valve housing being provided with transversely disposed passages extending from an upwardly extending passage communicating with the driving disk, to an upwardly extending passage communicating with the driven disk, means for operating the control valves simultaneously, to effect the placing of the transmission mechanism in neutral position, in reverse position, or in forward position, the valve housing being provided with a passageway connecting the control valves, and a by-pass valve interposed in the passageway.

3. A hydraulic transmission mechanism including a fluid-holding casing, alined driving and driven shafts mounted axially in the casing, a drive disk mounted on the driving shaft, a driven disk mounted on the driven shaft, a valve housing disposed upon the casing and provided with a pair of upwardly extending passages communicating with the driving disk, the housing being provided with a pair of upwardly extending passages communicating with the driven disk, control valves in the passages communicating with the driving disk, the valves being open at their lower ends and being provided with laterally opening ports, the valve housing being provided with passages connecting the adjacent upwardly extending passages communicating with the driving and driven disks, the valve housing being provided with transversely disposed passages extending from an upwardly extending passage communicating with the driving disk, to an upwardly extending passage communicating with the driven disk, means for operating the control valves simultaneously, to effect the placing of the transmission mechanism in neutral position, in reverse position, or in forward position, the valve housing being provided with a passageway connecting the control valves, a by-pass valve interposed in the passageway, and means operable from a remote position for actuating the by-pass valve independently of the control valves.

ANDREW LEROY AHART.